Sept. 9, 1958 A. E. KROGH 2,851,221
REVERSAL CONTROL FOR REGENERATIVE FURNACE
Filed April 30, 1954 2 Sheets-Sheet 1
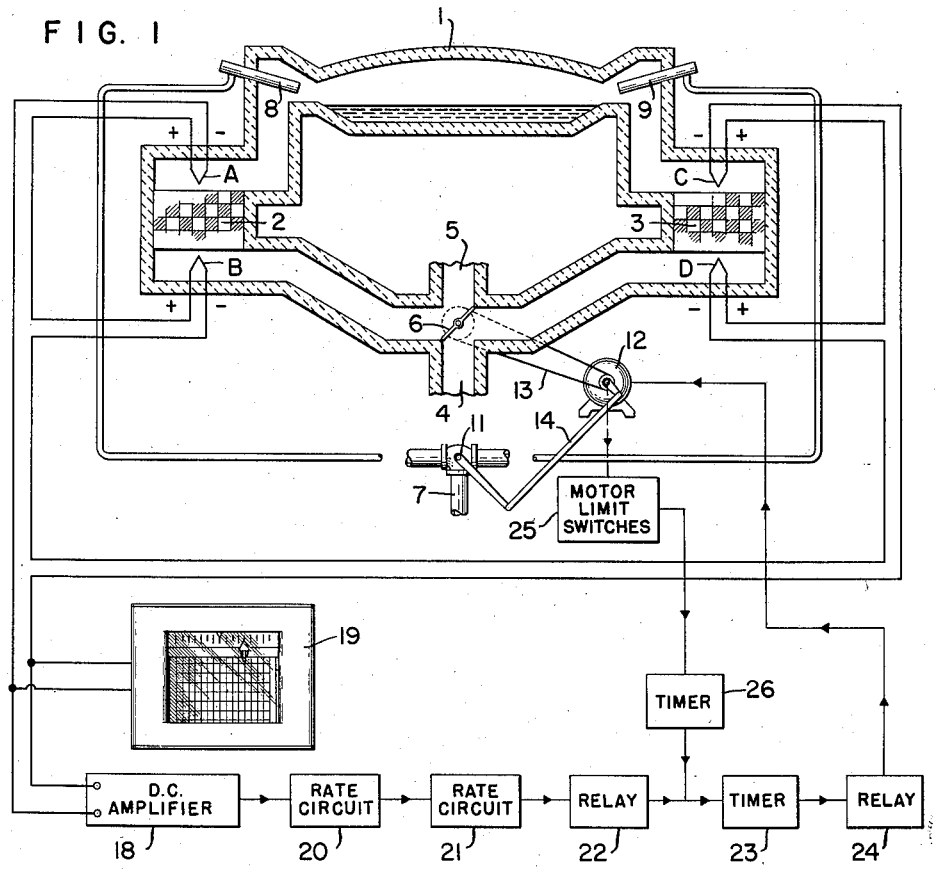
FIG. 1
FIG. 2
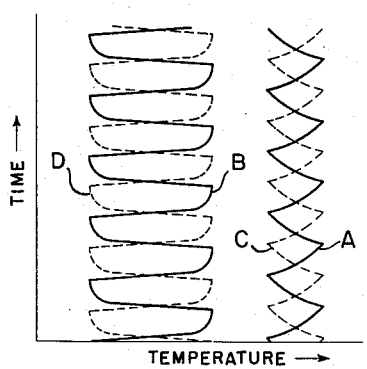
FIG. 3
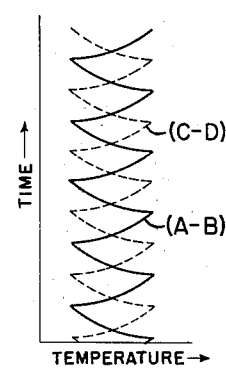
FIG. 4
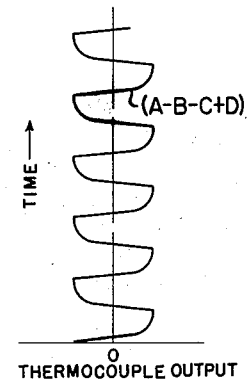
*INVENTOR.*
ANKER E. KROGH
BY
ATTORNEY.

Sept. 9, 1958  A. E. KROGH  2,851,221
REVERSAL CONTROL FOR REGENERATIVE FURNACE
Filed April 30, 1954  2 Sheets-Sheet 2
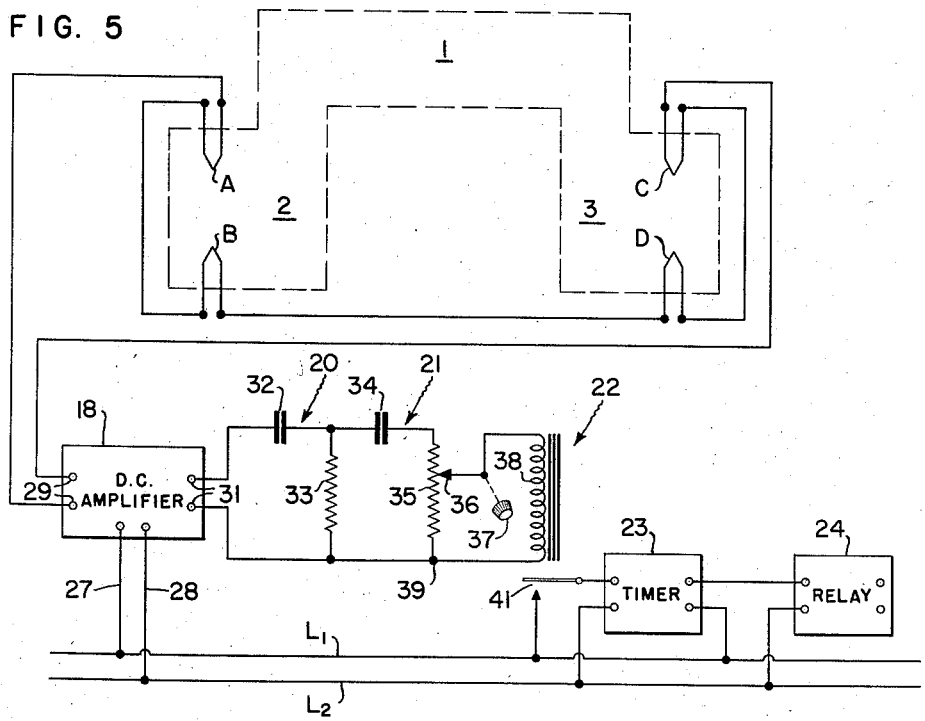
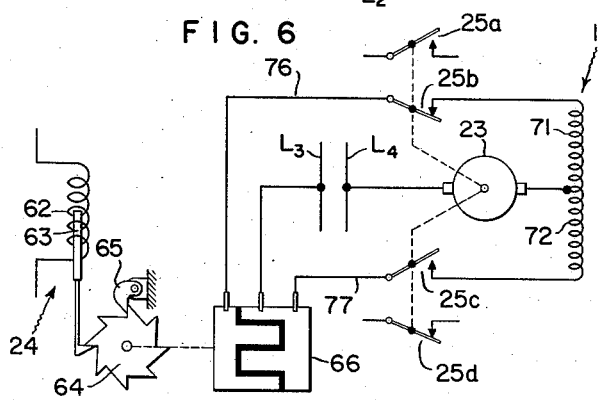
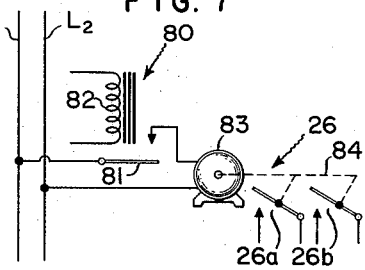
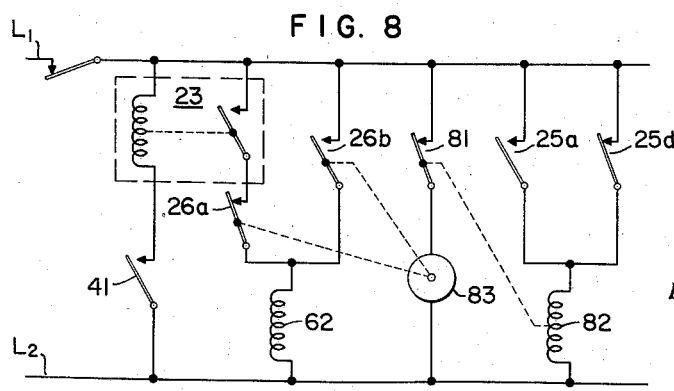
*INVENTOR.*
ANKER E. KROGH
BY
*Arthur H. Swanson*
ATTORNEY.

United States Patent Office 2,851,221
Patented Sept. 9, 1958

2,851,221

REVERSAL CONTROL FOR REGENERATIVE FURNACE

Anker E. Krogh, Glenside, Pa., assignor to Minneapolis-Honeywell Regulator Company, Minneapolis, Minn., a corporation of Delaware Application April 30, 1954, Serial No. 426,667

14 Claims. (Cl. 236—15)

The present invention relates to measuring and control apparatus for automatically controlling the reversal of an open hearth or other regenerative furnace.

The general object of this invention is to provide an improved control apparatus for controlling the reversal of an open hearth or other regenerative furnace. More specifically, the object of this invention is to provide an apparatus for controlling the reversal of a regenerative furnace in response to the rate of change of temperature conditions in the furnace.

In the operation of regenerative furnaces it is the general practice to preheat the air for combustion by passing it through a regenerative chamber or checker previously heated by the products of combustion from the furnace. This heated air then passes into the furnace where it meets the fuel for combustion. The products of combustion then pass out of the furnace through a second regenerative chamber, heating that chamber as they pass through it. As the preheated chamber gradually loses its heat to the incoming air, the temperature to which that air is heated will decrease and in time the flame temperature is reduced. It is then desirable to reverse the direction of the flow of air through the furnace and its regenerative chambers. Upon reversal of that flow, the incoming air for combustion will be preheated by the regenerative chamber previously heated by the products of combustion and the products of combustion will reheat the regenerative chamber previously cooled by the incoming air.

One of the purposes of the regenerative chambers is to produce the highest possible temperature in the connected furnace with the lowest possible rate of fuel consumption. To accomplish this, the air leaving the regenerators to the furnace must be at the highest practical temperature. This in turn will be best accomplished by making the chambers as hot as may be practical without an actual expenditure of fuel for that purpose, which requires the exact determination of the point of most profitable reversal.

Accordingly, another object of this invention is to provide an improved means for automatically determining the point of most profitable reversal.

The various prior art methods of control are satisfactory to a certain extent, but none of these methods takes into consideration the rate of change of temperature conditions in the furnace. After a reversal, the temperature of the preheated checker is continuously decreasing. Simultaneously, the amount of heat absorbed by the other checker, after an initial decrease, begins to increase at a rate which will approach zero and become negative if firing in the one direction is continued. Since the furnace loses efficiency as soon as the rate of decrease in the preheat exceeds the rate of increase in heat absorption, reversal should always be made at the time this condition is reached or before.

It is, therefore, a further object of the present invention to provide an apparatus for controlling the reversal of a regenerative furnace in response to the difference between the rate of change of the preheat and the rate of change of the heat absorption. Thus, this invention contemplates controlling furnace reversal in a manner that insures maximum efficiency in operation.

In the embodiment of this invention, hereinafter described in greater detail, the foregoing objects are accomplished by measuring the temperature differentials which exist across the regenerative chambers, taking the difference between these differentials, and automatically reversing the furnace when the rate of change of this difference equals a constant or some predetermined value.

The various features of novelty which characterize this invention are pointed out with particularity in the claims annexed to and forming a part of this specification. For a better understanding of this invention, its advantages, and specific objects attained with its use, references should be had to the accompanying drawings and descriptive matter in which are illustrated and described preferred embodiments of this invention.

Of the drawings:

Fig. 1 is a schematic diagram of a regenerative furnace with an embodiment of this invention employed to control its reversal;

Fig. 2 shows curves of the electrical outputs of the individual thermocouples shown in Fig. 1, which represent typical furnace temperatures;

Fig. 3 shows curves of the electrical outputs of the two differentially connected pairs of thermocouples shown in Fig. 1 which represent the temperature rise across one regenerative chamber and the temperature drop across the other regenerative chamber;

Fig. 4 is a curve of the electrical output of the differentially connected pairs of differentially connected thermocouples of Fig. 1;

Fig. 5 is a schematic diagram showing the interconnection of the thermocouples, the amplifier, the rate circuits, and the relays employed in the embodiment of this invention shown in Fig. 1;

Fig. 6 is a schematic diagram of the motor reversing relay, the reversing motor, and the motor limit switches employed in the embodiment of this invention shown in Fig. 1;

Fig. 7 is a schematic diagram of the motor driven timer employed in the embodiment of this invention shown in Fig. 1; and Fig. 8 is an across the line wiring diagram of the control circuit of the embodiment of this invention shown in Fig. 1.

Referring first to Fig. 1, there is shown as 1 a regenerative furnace of the open-hearth type which has regenerative chambers or checkers 2 and 3 at its ends. In the operation of the furnace, air is forced through an inlet 4 into one of the checkers which preheats the air to supply heated air for combustion. The furnace exhaust gases are forced out through the other checker to preheat that checker, and are exhausted through a stack 5. A damper 6, located in the junction of the supply and exhaust pipes, directs air through one end or the other end of the furnace and is rotated through 90 degrees to reverse the furnace operation. A suitable fuel is supplied to the furnace through a pipe 7 which has in it branches that lead to burners 8 and 9, one of which is located in each end of the furnace in such a position that the incoming air can be mixed with the fuel thereby insuring combustion. The pipe 7 at its junction leading to the burner is provided with a reversing valve 11 which can be operated to supply fuel to one or the other of the burners. The valve 6 and the valve 11 are activated in a conventional manner to reverse the operation of the furnace by means of an electric motor 12. As is shown herein, suitable driving means 13 extend between the motor 12 and the valve 6 and a link 14 extended between the motor 12 and the valve 11.

The reversing operations of the furnace are controlled in response to the electrical output of four differentially connected thermocouples. One thermocouple A is located in the duct above the checker 2 while the thermocouple B is located in the sewer below the checker 2. The thermocouples A and B are differentially connected to each other and their output alternately show the temperature drop of the hot gases leaving the furnace and the temperature rise of the incoming air for combustion. The thermocouples C and D are also differentially connected to each other and similarly located with respect to checker 3. Their outputs alternately show the temperature rise of the incoming air for combustion and the temperature drop of the gases leaving the furnace. These two pairs of differentially connected thermocouples are differentially connected to each other and are connected to the input terminals of a direct current amplifier 18. The amplifier 18 may be any suitable direct current amplifier capable of amplifying voltages of the type produced by themocouples. If a record of furnace operations is desired, the four thermocouples may also be connected to a self-balancing potentiometer 19. This potentiometer may be of the type disclosed and claimed in the Wills patent, 2,423,540 of July 8, 1947.

The output signal from the amplifier 18 is applied to a rate circuit 20 which is operative to differentiate that signal thereby producing a voltage proportional to the rate of change of the voltage from the thermocouples. Since furnace reversal is to be initiated when the rate of change of the thermocouple voltage is constant, the signal produced by the rate circuit 20 is applied to a second rate circuit 21. The rate circuit 21 differentiates that signal thereby producing a voltage proportional to the second derivative of the output of the thermocouples. When this second derivative signal is zero the rate of change of the thermocouple voltage is constant. The output of the rate circuit 21 energizes a relay 22, thus when the rate of change of the voltage produced by the thermocouples A, B, C, and D is constant the relay 22 is deenergized to initiate a furnace reversal.

To prevent a reversal from being signalled in response to a constant rate of change of the output of the four thermocouples caused solely by some transient condition in the furnace, the relay 22 does not directly control the reversal of the furnace. The relay 22 controls the timer 23 which, when energized by the relay 22, delays the operations of the motor reversing relay 24 for an interval determined by practice to be sufficient for eliminating the effect of such transient conditions. If during that interval the relay 22 is again energized, indicating that the controlling condition was transient, the timer 23 resets itself so as to be ready to repeat the timing operation and a reversal is not signalled.

The timer 23 controls the operation of the relay 24 which is a stepping relay of the motor reversing type and which, in turn, controls the energization of the reversing motor 12. The motor 12 is provided with limit switches, generally designated as 25, which limit its rotation and energize the timer 26. The timer 26 is of motor driven self-resetting type which is capable of performing a plurality of timing operations. The timer 26 is operative to initiate furnace reversal by energizing the relay 24 if the rate detecting means fail to deenergize the relay 22 in a predetermined time and is also operative to prevent the rate detecting means from operating the relay 24, through the relay 22 and the timer 23, for a predetermined time after a reversal.

The furnace operation is considered first just after a reversal, such that the firing is from the checker 3 towards the checker 2. With the thermocouples A, B, C, and D eletcrically connected as shown in Fig. 1, the simultaneous variations in their output will be as shown in Fig. 2. Thermocouple D measures the temperature of the air entering the checker 3. This temperature rapidly drops to a minimum and remains there with only small variations due to minor changes in the rate of firing. The thermocouple C measures the temperature of the air entering the furnace. This temperature continually decreases as firing progresses. The thermocouple A measures the temperature of the products of combustion leaving the furnace. This temperature increases as firing progresses up to the point where the temperature of the combustion air is so low that the flame temperature is reduced. As firing continues, therefore, the temperature at A will approach a point where its rate of increase with respect to time will be zero. Thermocouple B measures the temperature of the products of combustion leaving the checker 2. This temperature increases after reversal and then climbs at a rate effected by the rate of firing and the rate of heat absorption of the checker 2.

A representative showing of the temperature differences will be found in Fig. 3, wherein the solid curve shows the difference in temperatures between A and B while the dotted curve shows the difference in temperature between C and D. The quantity (C—D) is the temperature rise of the air for combustion and represents the preheat of the checker 3. This quantity immediately falls and must always do so except as a decrease in the rate of firing may momentarily increase the value of C. The quantity (A—B) is the temperature drop of the products of combustion and represents the heat absorption of the checker 2. This quantity, after an initial decrease, begins to increase at a rate which will approach zero and become negative if firing in the one direction is continued. It may be noted that although the direction of the gas flow reverses periodically, the thermocouples nearest the furnace are always hotter than the thermocouples at the opposite ends of the checkers. Hence, the quantities (A—B) and (C—D) are always positive. In general, the temperature rise of the incoming air as it passes through the checkers will reach a maximum shortly after reversal and will then tend to decrease at a rate dependent upon the rate of air flow. This rate decrease in the temperature rise may be expressed as $dR/dT$, where R is the rise in temperature of the incoming air and T is time. In general, the fall in temperature of the combustion gases as they pass out through the checkers will reach a minimum shortly after reversal and will then gradually increase as the entering thermocouple beats faster than the exit thermocouple. This rate of change in the temperature of the outgoing gases may be expressed as $dF/dT$, where F is the fall in temperature of the gases as they pass through the checkers, and T is time.

The curve in Fig. 4 shows the electrical output of the four differentially connected thermocouples, A, B, C, and D and represents the difference of the two temperature differences. The slope, S, of the curve (A—B—C+D) is such that $$\pm S = \frac{d(A-B-C+D)}{dT} = \frac{dR}{dT} - \frac{dF}{dT}$$

Since the preheat is continually decreasing, while the heat absorption is increasing until it starts decreasing, reversal should always be made before the latter starts decreasing. Furthermore, the furnace loses efficiency as soon as the rate of decrease in a preheat exceeds the rate of increase in heat absorption. Hence, reversal should be made at the time this condition is reached or before. In actual practice, reversal is usually made before the two rates are equal. The proper time for reversal is made automatically by measuring the slope of the curve shown in Fig. 4 and reversal is made when the derivative of that curve with respect to time approaches or equals a constant. For practical reasons, the apparatus for reversing the furnace from the derivative with respect to time the curve (A—B—C—D) is augmented by suitable auxiliary means, the timer 26, such that the minimum time will elapse between reversals and if the rate of change of that curve has not become constant in a predetermined time, reversal will nevertheless take place.

Fig. 5 is a schematic wiring diagram showing the interconnection between the thermocouples, the amplifier 18, the rate circuits 20 and 21, the relay 22, the timer 23, and the motor reversing relay 24. The four differentially connected thermocouples A, B, C, and D are connected to the input terminals 29 of the amplifier 18. The amplifier 18 is any suitable direct current amplifier capable of amplifying voltages of the type produced by thermocouples and which produces in its output a filtered direct voltage proportional to its input. The amplifier 18 is energized from a suitable source of alternating current, conductors $L_1$ and $L_2$, by means of the leads 27 and 28. The rate circuit 20 is connected to the output terminals 31 of the amplifier 18. The rate circuit 20 comprises the condenser 32 and the resistor 33. The condenser 32 and the resistor 33 are of such magnitudes that the voltage that appears across the resistor 33 is substantially proportional to the first derivative of the amplified signal produced by the amplifier 18. That is, the voltage which appears across the resistor 33 is substantially proportional to the rate of change of the voltage produced by the thermocouples A, B, C, and D. The rate circuit 21 is connected across the resistor 33 and comprises the condenser 34 and the slidewire resistor 35. The condenser 34 and the resistor 35 are of such magnitudes that the voltage which appears across the resistor 35 is substantially proportional to the second derivative of the voltage output from the thermocouples. A wiper contact 36 engages the slidewire resistor 35 and is adjustable along its length by means of the knob 37. The relay coil 38 of the relay 22 is connected between the wiper contact 36 and the end terminal 39 of the slidewire resistor 35.

When the second derivative of a function is equal to zero the rate of change of that function is constant. Thus, when the rate of change of the thermocouple output is a constant the voltage across the slidewire resistor 35 is zero and the relay 22 is deenergized. If it is desired to initiate furnace reversal slightly before the rate of change of the thermocouple voltages reach a constant, the knob 37 may be adjusted so that a smaller percentage of the voltage drop across the resistor 35 is applied to the relay 22. The relay 22 comprises in addition to the coil 38, a pair of contacts 41 which are operative to connect the timer 23 across the conductors $L_1$ and $L_2$. As explained before, the timer 23 delays the energization of the motor reversing relay 24 to prevent reversals caused by transitory furnace conditions. If the condition causing the relay 22 to be deenergized is not transitory, the timer 23 is operative to connect the coil 62 of the motor reversing relay 24, shown in Fig. 6, across the conductors $L_1$ and $L_2$.

Referring now to Fig. 6, there is shown schematically a diagram of the motor reversing relay 24, the reversing motor 12 and the motor limit switches 25. This motor reversing relay 24 is a stepping relay having a coil 62 which when energized attracts the armature 63 upwards. When armature 63 moves upwards it advances the ratchet wheel 64 one notch. The return of the ratchet wheel 64 is prevented by the stop pawl 65. A commutator 66 is attached to the ratchet wheel 64 and is thus advanced with the ratchet wheel. It is through this action that motor reversal is effected. The reversing motor 12 is shown here as a series motor having an armature 73 and two field windings 71 and 72. The field winding 71 is designed to cooperate with the armature 73, when energized, to drive the motor in one direction and the field winding 72 is designed to cooperate with the armature 73, when energized, to drive the motor in the opposite direction.

The motor 12 is energized from a suitable source of alternating current $L_3$ and $L_4$ by means of the conductors 76 and 77 through the commutator 66. The rotation of the motor 12 in the direction controlled by the field winding 71 is limited by the limit switch 25b and its rotation in the direction controlled by the field winding 72 is limited by limit switch 25c. As shown the motor 12 has completed furnace reversal in a direction controlled by the field winding 72. In so doing, the motor 12 rotated until it opens the limit switch 25c which deenergized the field winding 72. Simultaneously, it closed limit switches 25b and 25d, and opened the switch 25a. In closing switch 25b, it prepared the motor for rotation in a direction controlled by field winding 71 when the latter is energized by the advancing of the commutator 66 by the relay 24. The purpose of the motor limit switches 25a and 25d will be explained below.

Fig. 7 is a schematic diagram of the timer 26 employed in the embodiment of this invention shown in Fig. 1. The timer 26 is a motor driven timer of the self resetting type capable of performing a plurality of timing operations. As used here it performs two timing operations through the switches 26a and 26c. The timer has a motor 83 which controls the switches 26a and 26b through the gear train 84. The motor 83 is connected to a source of suitable alternating current, conductors $L_1$ and $L_2$, through the contacts 81 of the relay 80. As will be explained later the relay 80 has a coil 82 which when energized closes the contacts 81. When the timer motor 83 is so energized, the switch 26a is opened and remains open for approximately five minutes and the switch 26b is opened and remains open for approximately fifteen minutes. These time intervals can be adjusted to suit the timing conditions required in the operation of a particular furnace. When the motor 83 is deenergized the timer 26 automatically resets itself and is then ready to repeat these timing operations.

Fig. 8 is an across the line diagram of the control circuit of the embodiment of this invention shown in Fig. 1. It includes all of the various relays, limit switches, and timer switches employed to control the reversal operation. These switches and relays are shown as they would be if firing was in the direction such that the air for combustion was being preheated in the checker 3 and the furnace waste gases were heating the checker 2 and firing in that direction and progress for approximately ten minutes. In normal furnace operation, the rate of change of the output voltage of the differentially connected thermocouples would, at such a time, be approaching a constant value and furnace reversal would soon be initiated.

When the rate of change of the thermocouple voltage is constant, or some predetermined value selected by the adjustment of the knob 37, the relay 22 is deenergized and the contacts 41 are closed. This starts the timer 23 which delays the starting of a reversal for a predetermined interval to prevent transient reversals. Since the timer contact 26a is closed except during the five minutes immediately following a reversal, the closing of the contacts of the timer 23 energizes the coil 62 of the motor reversing relay 24. The relay 24 advances the commutator 66 and the reversing motor 12 is energized for rotation. If the field winding 71 of the reversing motor 12 controls its rotation in the direction necessary to effect the signaled reversal, that winding will be the one energized. As the motor 12 reverses the direction of the flow of air and fuel through the furnace 1 it opens the limit switches 25d and closes the limit switch 25a as well as turning itself off by opening the limit switch 25b and preparing for the next reversal operation by closing the contact 25c.

The limit switches 25a and 25d are both capable of energizing the coil 82 of the timer control relay 80. The timer 26 resets itself during the instant between the opening of the contacts 25d and the closing of the contacts 25a. Thus, upon the closing of the contact 25a the coil 82 of the timer control relay 80 is energized and the contacts 81 are closed energizing the timer motor 83. This starts a new timing cycle. As explained before, the contacts 26a are opened and remain open for five minutes following a reversal. This prevents the relay 23 from initiating a subsequent furnace reversal before the conditions in the furnace have stabilized. The second timing operation performed by the timer 26 is the closing of the contacts 26a at a predetermined time after reversal, say fifteen minutes, which initiates a new reversal. Thus, if the rate of change of the output of the thermocouples A, B, C, and D has not become constant by that time, reversal is nevertheless initiated.

While, in accordance with the provisions of the statutes, there has been illustrated and described the best form of the invention now known, it will be apparent to those skilled in the art that changes may be made in the form of the apparatus disclosed without departing from the spirit of the invention as set forth in the appended claims, and that in some cases certain features of the invention may be used to advantage without a corresponding use of other features.

Having now described my invention, what I claim as new and desire to secure by Letters Patent is:

1. An apparatus for controlling the reversal of a regenerative furnace, comprising in combination, means responsive to temperature conditions within the furnace, circuit means connecting said temperature responsive means to control apparatus operative to initiate reversal of the furnace when the value of the rate of change of said temperature conditions approaches a constant.

2. An apparatus for controlling the reversal of a regenerative furnace having regenerative chambers and means for controlling the flow of combustion materials, comprising in combination, temperature responsive means responsive to the temperature differentials across said chambers, and circuit means connecting said temperature responsive means to control apparatus operative to initiate furnace reversal when the rate of change of said differentials approaches a constant value.

3. An apparatus for controlling the reversal of a regenerative furnace having regenerative chambers, comprising in combination, temperature measuring means responsive to the difference between the temperature differentials across said chambers, and circuit means connecting said temperature measuring means to control apparatus operative to initiate furnace reversal when the rate of change of said differential approaches a constant.

4. An apparatus for controlling the reversal of the flow of combustion air and the products of combustion through a regenerative furnace having regenerative checkers and means to direct alternately the combustion air through said checkers, comprising in combination, temperature measuring means responsive to the temperature rise of the combustion air and the temperature drop of the products of combustion, circuit means connecting said temperature measuring means to control apparatus and means operated by said control apparatus for effecting reversal of said flow when the rates of change of said temperature rise and said temperature drop approaches a constant.

5. An apparatus for controlling the reversal of a regenerative furnace having two regenerative chambers and means for reversing the flow of combustion air and products of combustion, respectively, from one chamber to the other, comprising in combination, means responsive to the difference between the temperature rise of the combustion air and the temperature drop of the products of combustion, circuit means connecting said temperature responsive means to a control apparatus, and circuit means connecting said control apparatus to furnace reversing means operative to reverse said flow when rate of change of the rate of change of said difference approaches zero.

6. An apparatus for controlling the reversal of the flow of combustion air and the products of combustion through a regenerative furnace having regenerative chambers at its two ends, and means to direct alternately the combustion air through said chambers, comprising in combination, four differentially connected thermocouples responsive to temperature conditions in the furnace, circuit means connecting said thermocouples to control apparatus, said apparatus being operative to initiate reversal of the furnace when the value of the rate of change of the electrical output of said differentially connected thermocouples approaches a constant.

7. An apparatus for controlling the reversal of a regenerative furnace having two regenerative chambers, comprising in combination, two pairs of differentially connected thermocouples, each pair physically located with respect to one of said chambers that their output E. M. F. is proportional to the temperature differential across that chamber, said pairs of thermocouples being differentially connected to each other, circuit means connecting said thermocouples to control apparatus responsive to their output E. M. F.'s and means controlled by said apparatus for effecting reversal of said furnace when the rate of change of said output E. M. F.'s approaches a constant.

8. An apparatus for controlling the reversal of the flow of combustion air and the products of combustion through a regenerative furnace having regenerative chambers at its two ends and means to direct alternately the combustion air through said chambers, comprising in combination, four differentially connected thermocouples responsive to the difference between the temperature differentials across each chamber, circuit means connecting said thermocouples to an amplifier rate responsive means connected to said amplifier operative to initiate furnace reversal when the rate of change of the rate of change of the difference between said temperature differentials approaches a constant value.

9. An apparatus for controlling the reversal of the flow of combustion air and the products of combustion through a regenerative furnace having regenerative chambers at its two ends, and means to direct alternately the combustion air through said chambers, comprising in combination, two pairs of differentially connected thermocouples differentially connected to each other, each pair responsive to the temperature differential across one of said regenerative chambers, circuit means connecting said thermocouples to an amplifier, rate responsive means connected to and operated by said amplifier in response to the electrical output of said thermocouples, furnace reversing means connected to and operated by said rate responsive means when the rate of change of the electrical output of said thermocouples becomes constant, and timing means operated by said furnace reversing means operative to initiate furnace reversal if said rate of change fails to become constant in a predetermined period of time.

10. Apparatus as specified in claim 9 in which said timing means also prevents said rate responsive means from initiating furnace reversal for a predetermined period of time after a reversal.

11. An apparatus for controlling the reversal of a regenerative furnace comprising in combination, means responsive to the temperature conditions within the furnace, circuit means connecting said temperature responsive means to control apparatus operative to initiate furnace reversal when the value of the second derivative of the electrical output of said temperature responsive means approaches zero.

12. An apparatus for controlling the reversal of a regenerative furnace having regenerative chambers at its ends comprising in combination, temperature responsive means responsive to the temperature differentials across said chambers, and circuit means connecting said temperature responsive means to control apparatus operative to initiate furnace reversal when the second derivative of the electrical output of said temperature responsive means approaches zero.

13. An apparatus for controlling the reversal of the flow of combustion air and the products of combustion through a regenerative furnace having regenerative checkers, and means to direct alternately the combustion air through said checkers, comprising in combination, temperature means responsive to the temperature rise of the combustion air and the temperature drop of the products of combustion, circuit means connecting said temperature measuring means to control apparatus and means operated by said control apparatus for effecting reversal of said flow when the rate of change of the rate of change of said temperature rise and said temperature drop approaches zero.

14. An apparatus for controlling the reversal of the flow of combustion air and the products of combustion through a regenerative furnace having regenerative chambers at its two ends, and means to direct alternately the combustion air through said chambers, comprising in combination, four differentially connected thermocouples responsive to temperature conditions in the furnace, circuit means connecting said thermocouples to control apparatus, said apparatus being operative to initiate furnace reversal when the second derivative of the electrical output of said differentially connected thermocouples approaches zero.

References Cited in the file of this patent

UNITED STATES PATENTS

| | | |
|---|---|---|
| 1,825,372 | Sykes | Sept. 29, 1931 |
| 1,937,017 | Green | Nov. 28, 1933 |
| 1,950,614 | Krogh | Mar. 13, 1934 |
| 2,054,120 | De Florez | Sept. 15, 1936 |
| 2,282,726 | Jones | May 12, 1942 |
| 2,413,128 | Wills | Dec. 24, 1946 |